(12) United States Patent
Huang et al.

(10) Patent No.: US 6,933,078 B2
(45) Date of Patent: Aug. 23, 2005

(54) CROSSLINKED POLYMER ELECTROLYTES AND METHOD OF MAKING SUCH CROSSLINKED POLYMERS

(75) Inventors: Biying Huang, Henderson, NV (US); George W. Adamson, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 197 days.

(21) Appl. No.: 10/323,457

(22) Filed: Dec. 18, 2002

(65) Prior Publication Data

US 2004/0122178 A1 Jun. 24, 2004

(51) Int. Cl.[7] .............................................. H01M 8/00
(52) U.S. Cl. .................. 429/231.95; 429/316; 429/317; 29/623.1
(58) Field of Search ................................ 429/306, 309, 429/317, 322, 323, 231.95, 316; 29/623.1

(56) References Cited

U.S. PATENT DOCUMENTS

| | | |
|---|---|---|
| 6,361,901 B1 | 3/2002 | Mayes et al. |
| 6,395,416 B1 | 5/2002 | Tanemoto et al. |
| 6,395,419 B1 | 5/2002 | Kuwahara et al. |
| 6,395,429 B1 * | 5/2002 | Kang et al. .................. 429/306 |
| 6,406,817 B2 | 6/2002 | Wariishi et al. |
| 6,423,453 B1 | 7/2002 | Noda |
| 2002/0012849 A1 | 1/2002 | Miura et al. |
| 2002/0114996 A1 | 8/2002 | Schmidt et al. |
| 2003/0104272 A1 * | 6/2003 | Yamaguchi et al. ......... 429/137 |
| 2003/0124431 A1 * | 7/2003 | Hwang et al. ............... 429/316 |

FOREIGN PATENT DOCUMENTS

| | | |
|---|---|---|
| WO | WO 98/16960 A3 | 4/1998 |
| WO | WO 98/16960 A2 | 4/1998 |
| WO | WO 00/05774 | 2/2000 |

* cited by examiner

*Primary Examiner*—Michael Barr
*Assistant Examiner*—Monique Wills
(74) *Attorney, Agent, or Firm*—Cynthia S. Kovacevic; Roger A. Williams; Michael D. Ross

(57) ABSTRACT

This invention relates to crosslinked polymers useful as electrolytes in rechargeable batteries, to electrolytes containing such crosslinked polymers, to methods for making such polymer electrolytes, to electrodes incorporating such crosslinked polymers, to rechargeable batteries employing such crosslinked polymers as the electrolyte and to methods for producing such batteries.

10 Claims, No Drawings

CROSSLINKED POLYMER ELECTROLYTES AND METHOD OF MAKING SUCH CROSSLINKED POLYMERS

FIELD OF THE INVENTION

This invention relates to crosslinked polymers useful as electrolytes in primary and rechargeable batteries, to electrolytes containing such crosslinked polymers, to electrodes incorporating such crosslinked polymers, to rechargeable batteries employing such crosslinked polymers as the electrolyte and to methods for producing such batteries. The invention further relates to the use of these crosslinked polymers and conductive compositions containing these crosslinked polymers in solid-state batteries, fuel cells, sensors, supercapacitors, electrochromic devices and the like.

BACKGROUND OF THE INVENTION

The proliferation of portable electronic devices such as cell phones and laptop computers has lead to an increased demand for high capacity, long endurance light weight batteries. Because of this, alkali metal batteries, especially lithium ion batteries, have become a useful and desirable energy source. Lithium metal, sodium metal and magnesium metal batteries are also well known and desirable energy sources.

By way of example and generally speaking, lithium batteries are prepared from one or more lithium electrochemical cells containing electrochemically active (electroactive) materials. Such cells typically include, at least, a negative electrode, a positive electrode, and an electrolyte interposed between the positive and negative electrodes.

Lithium ion batteries are well known. Lithium ion batteries have an insertion anode, such as a lithium metal chalcogenide, lithium metal oxide, coke or graphite. These types of electrodes are typically used with lithium-containing insertion cathodes to form an electroactive couple in a cell. The resulting cells are not charged in an initial condition. Before this type of cell can be used to deliver electrochemical energy, it must be charged. In the charging operation, lithium is transferred from the lithium-containing electrode cathode to the negative electrode. During discharge the lithium is transferred from the negative electrode back to the positive electrode. During a subsequent recharge, the lithium is transferred back to the negative electrode where it reinserts. Thus with each charge/discharge cycle, the lithium ions ($Li^+$) are transported between the electrodes. Such rechargeable batteries are called rechargeable ion batteries or rocking chair batteries.

In order for the lithium ion battery to be successful it requires the use of an electrolyte that is highly conductive in order to sustain a high energy density. The performance of the lithium ion batteries is greatly affected by the quality of the electrolyte. Therefore, the battery industry is constantly attempting to improve the qualities and properties of electrolytes.

Conventional lithium ion batteries have employed liquid electrolytes. Such liquid electrolytes generally have relatively good ionic conductivities. However, such liquid electrolytes require the use of a physical separator to prevent electrical shorting which results in increased costs due to the need for separator material costs and extra processing costs. Additionally, such liquid electrolytes are subject to leakage, they restrict the feasible size and shape of the batteries, they can react chemically with the electrode components and they often exhibit electrochemical breakdown at voltages between 3V and above 4.5V.

Polymer electrolytes have been developed which are based on polymers and a conducting salt. Ion mobility through the electrolyte is possible through coordination of the lithium ion with suitable sites on the polymer chain. Many such conventional polymer electrolytes frequently have low ionic conductivities which do not meet the high demands needed to be met by modern batteries. Alternatively, such polymer electrolytes often lack dimensional stability which can be addressed by various modifications. However, often when modifications are made to improve dimensional stability ionic conductivity is impeded since conductivity requires a significant degree of polymer chain mobility.

Thus, alternative highly conductive electrolytes for use in modern batteries are constantly being sought. The crosslinked polymer electrolytes of the present invention are beneficial in that they are highly conductive, they have good chemical stability, they possess good mechanical properties, they have good thermal stability and they are of low toxicity. In addition, there is provided an economical and reproducible synthetic method for producing such electrolytes and batteries containing the electrolytes.

SUMMARY OF THE INVENTION

The present invention relates to polymer electrolytes which are comprised of at least two monomers. More specifically the crosslinked polymer electrolytes are comprised of a first monomer crosslinked to at least one other second monomer wherein the second or other monomers are the same or different from the first monomer characterized in that the crosslinked polymer so formed is highly non-crystalline. The polymers so formed are also highly amorphous. The monomers useful in the present invention are further set forth in the Detailed Description which follows. In one preferred embodiment the monomers are siloxane polymers or silicon analogs of polyethylene oxide (PEO) or silicon analogs of polypropylene oxide (PPO).

In another preferred embodiment the present invention relates to polymer electrolytes which are comprised of at least one low $T_g$ monomers. Such crosslinked polymer electrolytes are comprised of but are not limited to the monomers set forth in the Detailed Description which follows. Such polymer electrolytes have been found to be highly conductive. These crosslinked polymers also possess good mechanical properties, they have good thermal stability and they are of low toxicity. In a preferred embodiment, the crosslinked polymer electrolytes are comprised of a crosslinked polymer selected from the group consisting of (a) POEM-X-PDMSD-LiN($CF_3SO_2$)$_2$; (b) POEM-X-PDMSD-EC-BL-LiBF$_4$; (c) POEM-X-PDMSD-EC-BL-LiPF$_6$; (d) POEM-X-PDMSD-EC-BL-LiBF$_4$-LiPF$_6$; (e) POEM-X-PDMSD-EC-PC-LiN($CF_3SO_2$)$_2$; (f) POEM-X-PTEVS-LiN($CF_3SO_2$)$_2$; (g) POEM-X-PTEVS-PEGDME-LiN($CF_3SO_2$)$_2$; (h) POEM-X-PTEVS-EC-PC-LiN($CF_3SO_2$)$_2$; and (i) POEM-X-PDMSM-PEGDME-LiN($CF_3SO_2$)$_2$.

The invention also relates to the crosslinked polymers themselves and a method for producing the crosslinked polymers. The crosslinked polymers find use in batteries, in particular lithium metal and lithium ion batteries, as electrolytes. Such crosslinked polymers also find use in fuel cells, sensors, supercapacitors, electrochromic devices and the like. Preferred crosslinked polymers are (a) POEM-X-

PDMSD-LiN(CF$_3$SO$_2$)$_2$; (b) POEM-X-PDMSD-EC-BL-LiBF$_4$; (c) POEM-X-PDMSD-EC-BL-LiPF$_6$; (d) POEM-X-PDMSD-EC-BL-LiBF$_4$-LiPF$_6$; (e) POEM-X-PDMSD-EC-PC-LiN(CF$_3$SO$_2$)$_2$; (f) POEM-X-PTEVS-LiN(CF$_3$SO$_2$)$_2$; (g) POEM-X-PTEVS-PEGDME-LiN(CF$_3$SO$_2$)$_2$; (h) POEM-X-PTEVS-EC-PC-LiN(CF$_3$SO$_2$)$_2$; and (i) POEM-X-PDMSM-PEGDME-LiN(CF$_3$SO$_2$)$_2$. It has been found that such polymers are useful as electrolytes which afford both high ionic conductivity and good dimensional stability. Such crosslinked polymers are produced by a method which is both economical and reproducible.

In another embodiment of the invention such crosslinked polymers are incorporated into the electrodes of the batteries. The crosslinked polymers can easily be incorporated into either the anode or the cathode. Such anodes and cathodes are easily produced and are beneficial in that they have a high energy density, are produced by an economical fabrication process, have good thermal stability and are abuse tolerant. The anodes are made by mixing a crosslinkable first monomer, e.g. POEM or PEGDMA with a second crosslinkable monomer, an inorganic salt (preferably a Li$^+$ salt) and an initiator. To this mixture is added an anode intercalation material and an electronically conductive filler. The slurry is then cast on a current collector using a doctor blade and heated under inert gas (preferably N$_2$ or argon gas) form an anode electrode. The cathodes are made in the same manner substituting a cathode intercalation material for the anode intercalation material.

In another aspect of the invention such crosslinked polymers are interposed between a cathode and an anode to form highly conductive electrochemical cells or batteries. In a preferred embodiment the electrochemical cell is a lithium ion battery. Such batteries can optionally contain the anode and cathode electrodes comprised of an anode or cathode active material, a crosslinked polymer and an electronically conductive filler, which are disclosed and claimed herein. The batteries are easily produced by positioning the electrolyte over an anode; positioning a cathode over the electrolyte and heating such assembly to melt flow of the electrolyte.

DETAILED DESCRIPTION OF THE INVENTION

As stated above this invention relates to crosslinked polymers useful as electrolytes in rechargeable batteries, to electrolytes containing such crosslinked polymers, to electrodes incorporating such crosslinked polymers, to rechargeable batteries employing such crosslinked polymers as the electrolyte and to methods for producing such batteries. The invention further relates to the use of these polymers and conductive compositions in solid-state batteries, fuel cells, sensors, supercapacitors, electrochromic devices and the like.

A lithium solid polymer electrolyte battery is an attractive technology due to its high energy density and economical costs of associated materials and processing of the same. However a successful lithium battery requires an electrolyte which is highly conductive in order to sustain a high density.

Solid polymer electrolytes have been developed in which ion mobility is possible through coordination of the lithium ion with suitable sites on the polymer chain. It is known that for most polymer electrolytes there exists an inverse relationship between ionic conductivity and dimensional stability. The polymer electrolytes known in the art demonstrate either good ionic conductivity or good dimensional stability but generally not both.

To date the most common approaches to solid polymer electrolytes for lithium batteries have employed high-molecular weight ($M_n>10^{-5}$) polymers on polyethylene oxide (PEO). It has been found that such PEO based polymer electrolytes form poorly conductive crystalline complexes with room temperature conductivities of less than $10^{-5}$ S/cm It has also been found that the use of random, graft and block copolymers limits the crystallinity of the PEO segments but the room temperature conductivities of most of these polymers rarely exceeds $10^{-4}$ S/cm a value which is low for many applications. To obtain higher conductivities with cells employing such electrolytes the normal operating temperature must be $\geq 80°$ C. At these temperatures however, the polymer behaves as a viscous liquid and loses much of its dimensional stability (resistance to flow).

It is now widely accepted that ionic conductivity predominates in the amorphous regions of PEO electrolytes rather than in the crystalline regions. The local relaxation and segmental motion of the polymer chains appears to be a requirement for lithium ion transport. Ionic motion in the polymer electrolytes is coupled with local segmental motion.

Ionic motion in polymer electrolytes is related to local segmental motion. Given the relationship between ionic conductivity and chain mobility current research has been directed toward synthesizing amorphous, low $T_g$ polymer electrolytes. Strategies to improve conductivity at ambient temperatures have included modifying molecular architectures and compositions to preempt crystallization. These approaches have on occasion resulted in materials with high conductivities at ambient temperatures but their liquid-like nature requires the use of a separator or supporting matrix in a battery configuration.

Crosslinking has been used as a technique for increasing mechanical rigidity to polymeric electrolytes. One approach is to prepare network-type structures via irradiation or chemical crosslinking. Previously, it was believed in the industry however, that crosslinked networks of solid polymer electrolyte materials do not flow and are insoluble. Thus, it would follow that their preparation into an electrolyte film and incorporation into and arrangement in a battery would be difficult.

To address this problem in the present invention, the crosslinked polymer electrolyte film was made using a free radical synthesis method to crosslink the macromonomers and thereafter directly producing an electrolyte film containing the same to produce a highly conductive crosslinked polymer electrolyte. The crosslinked polymers can also be produced by other common crosslinking methods known to those skilled in the art. This same methodology was employed in making the battery electrode (anode and cathode) components. It has now been found that by introducing highly amorphous, commercially available, polymers into crosslinked networks that simple crosslinking reactions allow for conversion of the crosslinked polymer electrolytes into rubbery materials with conductivities that rival liquid electrolytes.

Having explored most of the possibilities offered by "dry" polymers to improve conductivity it was found that one remaining option was to use additives, known in the polymer art as plasticizers, to act as chain lubricants. A lightly plasticized material improves conductivity by an order of magnitude or higher without compromising the mechanical property of the polymer electrolytes. The lightly plasticized systems can be used in a Li-metal configuration, as much of the resilience of the pristine polymer is retained. Therefore, in the present invention, the crosslinked polymer electrolytes can optionally contain a plasticizer.

Plasticizers useful in the present invention are typically an organic solvent. Such organic solvents include, but are not limited to, propylene carbonate (PC), ethylene carbonate (EC), diethyl carbonate (DEC), dimethyl carbonate (DMC), dipropyl carbonate, dimethylsulfoxide, dimethoxyethane, N-methyl-2-pyrrolidone (NMP), γ-butyrolactone (BL) and the like, and combinations thereof. Many such plasticizer are commercially available from DuPont and other vendors known to those skilled in the art.

Polyethylene glycol methacrylate (known also as (oxyethylene)$_9$ methacrylate) is a useful low $T_g$ (~−65° C.) macromonomerfor incorporation into crosslinked polymers which are useful as polymer electrolytes in batteries. The (EO)$_9$ chains of the resulting POEM polymer are small enough to prevent crystallization but long enough to solvate a lithium salt such as LiBF$_4$.

The methacryloxypropyl terminated polydimethylsiloxane (PDMSD), the monomethacryloxypropyl terminated polydimethylsiloxane (PDMSM) and the polymer of triethoxyvinyllsilane (PTEVS) are known to have low $T_g$, good chemical and thermal stability and low toxicity. The present invention demonstrates that such polymers are good components or macromonomers for incorporation into crosslinked polymers which are useful as polymer electrolytes in batteries. All of these polymers or macromonomers or monomers are commercially available.

It should be noted that PDMSD and PDMSM have similar glass transition temperatures. However, PDMSM is a one end terminated methacrylate monomer and PDMSD is a two end terminated methacrylate monomer. It was found that the PDMSM could be easily grafted onto the POEM monomer but that the PDMSD could be easily crosslinked with the POEM monomer using the free radical synthesis method. (A PDMSM crosslinked polymer can be prepared using alternate synthesis methods.) The POEM-g-PDMSM polymer is a soluble electrolyte with a relatively lower conductivity and poor mechanical properties. Whereas the POEM-X-PDMSD polymer is not soluble in solvents, it exhibits high conductivity and good mechanical properties. This data demonstrates that crosslinked polymers offer both high ionic conductivity and dimensional stability.

The following terms and abbreviations as used herein have the definitions and meaning described below:

AIBN: z-azobisisobutyronitrile
Al$_2$O$_3$: aluminum oxide
BL: γ-butryolactone
BMA: n-butyl methacrylate
DEC: diethylcarbonate
DMC: dimethyl carbonate
EC: ethylene carbonate
MMA: methyl methacrylate
NMP: N-methyl-2-pyrrolidone
PBMA poly(n-butyl methacrylate)
PC: propylene carbonate
PDMS: poly(dimethylsiloxane) monomethacrylate ethyl methacrylate
PDMSD: methacryloxypropyl terminated polydimethylsiloxane
PDMSM: monomethacryloxypropyl terminated polydimethylsiloxane
PEGDMA: poly(ethylene glycol) dimethacrylate methyl methacrylate
PEGDME: poly(ethylene glycol) dimethyl ether
PMMA: poly methyl methacrylate
PEO: polyethylene oxide
POEM: poly(ethylene glycol) methyl ether methacrylate
PPO: polypropylene oxide
PTEVS: poly(triethoxylsilane)
TEVS: triethoxyvinylsilane
$T_g$: glass transition temperature
THF: tetrahydrofuran
μm: microns
wt: weight
X: as used in the polymer formulas indicates crosslinkage.

As used herein "battery" refers to a device comprising one or more electrochemical cells for the production of electricity. Each electrochemical cell comprises an anode, a cathode and an electrolyte.

As used herein the terms "anode" and "cathode" refer to the electrodes at which reduction and oxidation occur, respectively, during battery discharge. During charging of the battery, the sites of oxidation and reduction are reversed.

As used herein the words "preferred" and "preferably" refer to embodiments of the invention that afford certain benefits under certain circumstances. However, other embodiments may also be preferred under the same or other circumstances. Further, the recitation of one or more preferred embodiments does not imply that other embodiments are not useful and is not intended to exclude other embodiments from the scope of the invention.

As used herein the term "highly non-crystalline" means that the crosslinked polymers are essentially crystal free or that the crosslinked polymers are highly amorphous, such that the crosslinked polymer is not characterized by geometrically arranged planar surfaces (faces) and a symmetrical internal structure. Such highly non-crystalline crosslinked polymers are more amorphous than crystalline. Such non-crystallinity can be determined by means of x-ray diffraction (XRD). Such XRD would demonstrate that the crosslinked polymer was highly non crystalline.

Crosslinked Polymers and Electrolyte Films Crosslinking of polymers can be achieved according to various conventional methods well known to those skilled in the art using well known crosslinking agents. The methods include heating, ultraviolet radiation, electron beams, free radical polymerization or atom transfer radical polymerization method, Michael reaction (U.S. Pat. No. 6,406,817), subjecting monomeric radiation polymerizable compounds to radiation, and the like. Variations and combinations of the above listed methods would also be apparent as useful to those with skill in the art.

The crosslinked polymers of the present invention can be prepared by a variety of methods. The preferred method for preparing the crosslinked polymers of the present invention is the free radical synthesis method and the ultraviolet radiation method.

In general, the present invention relates to crosslinked polymers and uses thereof. The crosslinked polymers are comprised of at lease two monomers. More specifically the crosslinked polymers are comprised of a first monomer crosslinked to at least one second monomer wherein the second or other monomers are the same or different from the first monomer characterized in that the crosslinked polymer formed thereby is highly non-crystalline. The crosslinked polymers formed thereby are highly amorphous. In one preferred embodiment the monomers are siloxane polymers or silicon analogs of polyethylene oxide (PEO) or silicon analogs of polypropylene oxide (PPO). In another preferred embodiment such crosslinked polymers are comprised of at least one low $T_g$ polymer.

The crosslinked polymers of the present invention include, but are not limited to, POEM based polymers, PEGDMA-based polymers, and PEGMA-based polymers, and polymers similar thereto which would be recognized by those with skill in the art. The macromonomers useful in the present invention can be any chain length but most preferably have a chain length of (n)=about 7 to about 14 of $(EO)_n$. The crosslinked polymers of the present invention can also have macromonomers of differing chain lengths meaning that the first and second monomers can have different chain lengths.

The POEM-based polymers, PEGDMA-based polymers, PEGMA-based polymers and the like are comprised of POEM, PEGDMA, PEGMA or analogs thereof crosslinked to or with the following polymers, macromonomers, or monomers, but are not limited thereto: any methacrylate and acrylate functional siloxanes; any vinyl functional siloxanes. In one preferred embodiment polymers, macromonomers or monomers include, but not limited thereto, methacryloxypropyl terminated polydimethylsiloxanes; (methacryloxypropyl) methylsiloxane-dimethylsiloxane copolymer; methacryloxypropyl T-structure siloxanes; 3-acryloxy-2-hydroxypropyl terminated polydimethylsiloxanes; acryloxy terminated dimethylsiloxane-ethyleneoxide copolymer; methacryloxypropyl terminated branched polydimethylsiloxanes; monomethacryloxypropyl terminated poly(dimethylsiloxane); (acryloxypropyl)methylsiloxane-dimethylsiloxane copolymers; (3-acryloxy-2-hydroxypropoxypropyl)methylsiloxane-dimethylsiloxane copolymer terminated polydimethylsiloxanes; vinyl terminated diphenylsiloxane-dimethysiloxane copolymer; vinyl terminated polyphenylmethylsiloxane copolymer; vinyl terminated diethylsiloxane copolymer; vinyl terminated trifluoropropylmethylsiloxane-dimethylsiloxane copolymer; vinyl terminated diethylsiloxane-dimethyl siloxane copolymer; n-butyl methacrylate; methyl methacrylate; triethoxyvinylsilane; and poly(triethoxysilane). The above list is intended to be exemplary but not all inclusive. Those skilled in the art would recognize other similar polymers, monomers or macromonomers or could identify polymers, monomers and macromonomers which would be useful for producing the crosslinked polymers of the present invention by reviewing a catalog such as that distributed by Gelest entitled "Reactive Silicones: Forging New Polymer Links" (Version 3.0).

In general, the crosslinked polymers of the present invention were prepared by mixing the selected soluble polymer with a solution mixture of a monomer, a Li salt, an initiator and optionally with a plasticizer to produce a high viscosity slurry. The slurry is then spread onto a substrate (e.g. PTFE plate, glass, foil, separator, nonwoven mat, paper) or is extruded into free air. It is then heated under an argon gas atmosphere (or other inert gas such as $N_2$ atmosphere) to form a polymer electrolyte film. The film can be as thick as desired and as compatible for use in a battery, fuel cells, sensors supercapacitors or any electrochromic devices and the like. The preferred thickness for use in a battery is from about 0.1 μm to about 200 μm and preferably is from about 1 μm to about 30 μm and more preferably is from about 5 μm to about 15 μm. Generally the film has a thickness of about 15 μm.

Preferably the soluble polymer is POEM ($T_g$~−65° C.) or PEGDMA. Preferably, the second monomer is selected from the group consisting of methacrylate and acrylate functional siloxanes; vinyl functional siloxanes; that can include, but are not limited to, methacryloxypropyl terminated polydimethylsiloxanes; (methacryloxypropyl) methylsiloxane-dimethylsiloxane copolymer; methacryloxypropyl T-structure siloxanes; 3-acryloxy-2-hydroxypropyl terminated polydimethylsiloxanes; acryloxy terminated dimethylsiloxane-ethyleneoxide copolymer; methacryloxypropyl terminated branched polydimethylsiloxanes; monomethacryloxypropyl terminated poly(dimethylsiloxane); (acryloxypropyl)methylsiloxane-dimethylsiloxane copolymers; (3-acryloxy-2-hydroxypropoxypropyl)methylsiloxane-dimethylsiloxane copolymer terminated polydimethylsiloxanes; vinyl terminated diphenylsiloxane-dimethysiloxane copolymer; vinyl terminated polyphenylmethylsiloxane copolymer; vinyl terminated diethylsiloxane copolymer; vinyl terminated trifluoropropylmethylsiloxane-dimethylsiloxane copolymer; vinyl terminated diethylsiloxane-dimethyl siloxane copolymer; n-butyl methacrylate; methyl methacrylate; triethoxyvinylsilane; and poly(triethoxysilane). Alternatively the second monomer can be selected from the group consisting of PDMSD, PDMSM and PTEVS. It is contemplated that crosslinked polymers can be made according to the invention which are POEM-based, and PEGDMA-based. By "based" is meant that a crosslinked polymer incorporates such monomer. The ratio of the first and second monomers varies. The ratio can vary from 0.01:99.99 to 99.99:0.01.

The polymeric electrolyte matrix of the present invention may optionally comprise an organic or inorganic salt, which is dispersed on the crosslinked polymer matrix through coordination of the ion (eg. $Li^+$) with suitable sites on the polymer chain. Salts suitable for use in the electrolyte of the present invention include, but are not limited to, inorganic salts containing a cation selected from the Group Ia and IIa elements associated with appropriate anions such as $BF_4^-$, $ClO_4^-$, $PF_6^-$ and the like. Preferably the inorganic salt is a lithium or sodium salt. More preferably the inorganic salt is a lithium salt, such as for example, $LiBF_4$, $LiBF_6$, $LiAsF_6$, $LiPF_6$, $LiClO_4$, $LiB(C_6H_5)_4$, $LiAlCl_4$, $LiBr$, $LiCF_3SO_3$, $LiN(CF_3SO_2)_2$, $LiC(CF_3SO_2)_3$, $LiN(SO_2C_2F_5)_2$, $Li[B(O_4C_2)]_2$ and mixtures thereof. Typical alkali metal salts useful in the present invention include, but are not limited to salts having the formula $M^+X^-$ where $M^+$ is an alkali metal cation such as $Li^+$, $Na^+$, $K^+$, and combinations thereof; and $X^-$ is an anion such as $Cl^-$, $Br^-$, $I^-$, $ClO_4^-$, $BF_4^-$, $PF_6^-$, $AsF_6^-$, $SbF_6^{31}$, $CH_3CO_2^{31}$, $CF_3SO_3^{31}$, $N(CF_3SO_2)_2^{31}$, $N(CF_3SO_2)_2^-$, $C(CF_3SO_2)_2^-$ and combinations thereof. Preferably the inorganic salt is a lithium, magnesium or sodium salt. The amount of salt added can range from about 0.5 wt % to about 75 wt %, preferably from about 1 wt % to about 25 wt %, and more preferably from about 3 wt % to about 10 wt %.

Plasticizers can optionally be added to the reaction mixture or the crosslinked polymers can be plasticizer free. When used, the plasticizers act as chain lubricants. The lightly plasticized material improves conductivity by an order of magnitude or higher without compromising the mechanical properties of the crosslinked polymer electrolytes. A preferred plasticizer is 1.5M $LiBF_6$ or EC/BL (1:3 by volume) because of its good compatibility with the polymer, its high conductivity (over $6\times10^{-3}$ S/cm at room temperature and over $1.0\times10^{-3}$ S/cm at −40°), its low vapor pressure, high boiling point (216° C.) and its good electrochemical stability. One skilled in the art would recognize other plasticizer which would be useful in the present invention, however the following organic solvents or combinations thereof are exemplary of, but not limited to plasticizers which would be useful in the present invention: propylene carbonate (PC), ethylene carbonate (EC), diethyl carbonate (DEC), dimethylcarbonate (DMC), dipropyl carbonate, dimethylsulfoxide, dimethoxyethane, N-methyl-2-pyrrolidone (NMP), γ-butryolactone (BL), and low molecular weight polymers such as poly(ethylene glycol) dimethyl ether. The amount of plasticizer added can be from about 1 wt % to about 85 wt %, preferably from about 1 wt % to about 35 wt % and more preferably from about 10 wt % to about 30 wt %.

An "initiator" is used to initiate the polymerization reaction. The amount of initiator used can determine the molecular weight of the resulting polymer. The less initiator added the higher molecular weight of the resulting polymer is expected. In a preferred embodiment of the present invention the initiator is AIBN. In preferred embodiments of the present invention the ratio of monomer:initiator is from about 50:1 to about 1000000:1 in mole ratio. However it is understood by those skilled in the art that the ratio of monomer:initiator can vary widely and be outside of this preferred range.

Chain polymerization is initiated by a reactive species R* produced from a compound "I" (initiator). I→R*. The reactive species, which may be a free radical, cation or anion adds to a monomer molecule by opening the p-bond to form new radicals, cations or anion centers. The process is repeated as many more monomer molecules are successively added to continuously propagate the reactive center. The polymer growth is terminated at some point by destruction of the reactive center by an appropriate reaction depending on the type of reactive center and particular reaction conditions which can be determined by those skilled in the art.

The initiation consists of two reactions. The first is the production of free radicals by any number of reactions. The usual case is the hemolytic dissociation of an initiator catalyst species "I" to yield a pair of radicals R* of a chain reaction. I($k_d$)→2R8 where $k_d$ is the rate constant for the catalyst dissociation. The second reaction involves the addition of this radical to the first monomer molecule to generate the chain initiating species MI*. R*+M($k_i$)→M* where M represents a monomer molecule and $k_i$ is the rate constant.

Any temperature above 40° C. will initiate the decomposition of AIBN. However, the temperature can control the speed of the polymerization. The higher the temperature is the faster the polymerization proceeds. In a preferred embodiment of the present invention the temperature can be from about 60° C. to about 120° C. The reaction time varies depending on the reaction temperature. The higher the reaction temperature is the shorter the reaction time is. Since oxygen is generally an inhibitor for methacrylate polymerization the reaction must be carried out under an atmosphere that is essentially free from oxygen. Argon is the preferred inert atmosphere however any inert atmosphere such as nitrogen, He or Ne can be used in carrying out the reaction.

The crosslinked polymer electrolytes so produced exhibit high conductivities, good chemical stability, good mechanical properties, good thermal stability and low toxicity. Cycling testing have shown that the crosslinked polymer electrolytes of the present invention are useful in a solid polymer electrolyte lithium ion battery. At 23° C. conductivity has been recorded from about $4.5 \times 10^{-5}$ up to about $10^{-3}$ S/cm. This higher conductivity is achieved without use of a plasticizer. Furthermore, since the electrolyte is incorporated directly into the battery electrodes no other binder is needed thus allowing for up to 10% volume of more electroactive material to be included in the electrodes. Additionally, the crosslinked polymer electrolyte as prepared does not necessarily require a separator which is needed for liquid containing electrolytes thus allowing a more economical production of said batteries where a separator is not needed.

Electrodes. The present invention also provided for electrodes, (cathodes and anodes) which comprise the crosslinked polymers. The crosslinked polymers function as a binder in the electrodes. Such electrodes containing the crosslinked polymers find use in batteries, and preferably in the batteries of the present invention containing the crosslinked polymer electrolyte of the present invention. They also find use in the method of producing a crosslinked polymer electrolyte battery which is another aspect of the present invention.

Generally, the selected soluble polymer or macromonomer or monomer is mixed with a solution of a second monomer, a salt (prefereably a Li$^+$ salt), and an initiator. To this mixture is added an anode or cathode intercalation material and an electronically conductive filler. The slurry is then caste on a current collector using a doctor blade then heated under argon gas to form an anode or cathode electrode film.

Preferably, the selected soluble polymer is POEM ($T_g$~–65° C.). Preferably, the second monomer is selected from the group consisting of PDMSD, PDMSM and PTEVS. It is contemplated that crosslinked polymers can be made according to the invention which are POEM-based, PDMSD-based, PDMSM-based and PTEVS-based. By "based" is meant that a crosslinked polymer incorporates such monomer.

The lithium salt, is for example, LiBF$_4$, LiBF$_6$, LiAsF$_6$, LiPF$_6$, LiClO$_4$, LiB(C$_6$H$_5$)$_4$, LiAlCl$_4$, LiBr, LiB(C$_6$H$_5$)$_4$, LiAlCl$_4$, LiCF$_3$SO$_3$, LiN(CF$_3$SO$_2$)$_2$, LiC(CF$_3$SO$_2$)$_3$, LiN(SO$_2$C$_2$F$_5$)$_2$, Li[B(O$_4$C$_2$)]$_2$ and mixtures thereof. Typical alkali metal salts useful in the present invention include, but are not limited to salts having the formula M$^+$X$^-$ where M$^+$ is an alkali metal cation such as Li$^+$, Na$^+$, K$^+$, and combinations thereof; and X$^-$ is an anion such as Cl$^-$, Br$^-$, I$^-$, ClO$_4^-$, BF$_4^-$, PF$_6^-$, AsF$_6^-$, SbF$_6^-$, CH$_3$CO$_2^-$CF$_3$SO$_3^-$, N(CF$_3$SO$_2$)$_2^-$, N(CF$_3$SO$_2$)$_2^-$, C(CF$_3$SO$_2$)$_2^-$, and combinations thereof. Preferably the lithium salt is LiBF$_4$ or LiPF$_6$.

Anode intercalation materials include, but are not limited to lithium, carbon, graphite, cokes, meso carbons, tungsten oxides, titanates, metal oxides (particularly transition metal oxides), metal phosphates (particularly transition metal phosphates), sulfates, silicates, vanadates, metal chalcogenides and lithium alloys, such as alloys of lithium with aluminum, mercury, manganese, iron, and zinc and physical and chemical mixtures thereof. A preferred anode material is carbon, such as coke or graphite, specifically MCMB: meso-carbon micro-beads (Osaka Gas Company, Limited, Japan) and MCF: mesophase-pitch based carbon fiber (Petoca Corporation Limited, Japan). However, any electroactive anode material compatible with the disclosed process can be used. The amount of anode intercalation material added can range from about 10 wt % to about 98 wt %, preferably from about 60 wt % to about 98 wt %, more preferably from about 80 wt % to about 93 wt % and most preferably from about 85 wt % to about 97 wt %.

Active cathode materials include but are not limited to transition metal phosphates, metal oxides (particularly transition metal oxides), metal chalcogenides and mixtures thereof. Other active cathode materials include lithiated transition metal oxides such as LiCoO$_2$, LiNiO$_2$, and mixed transition metal oxides such as LiCo$_{1-m}$Ni$_m$O$_2$, where 0<m<1. Other active materials include lithiated spinet active materials exemplified by compositions having a structure of LiMn$_2$O$_4$. Other cathode active materials include but are not limited to lithium vananadium phosphate, CoO, lithium metal, lithium sulfide and the like. The preferred cathode materials are transition metal phosphates such as disclosed in U.S. Ser. No. 09/484,799 (filed Jan. 18, 2000), U.S. Ser. No. 09/484,919 (filed Jan. 18, 2000), U.S. Ser. No. 10/116,276 (filed Apr. 3, 2002), U.S. Ser. No. 10/116,450 (filed Apr. 3, 2002) and U.S. Ser. No. 10/115,802 (filed Apr. 3, 2002) hereby incorporated herein by reference. Other preferred cathode materials are lithium vanadium phosphates such as those disclosed in U.S. Pat. No. 5,871,866 issued Feb. 16, 1999; U.S. Pat. No. 5,908,716 issued Jun. 1, 1999; U.S. Pat. No. 6,136,472 issued Oct. 24, 2000; U.S. Pat. No. 6,153,333 issued Oct. 28, 2000; U.S. Pat. No. 6,387,568 issued May 14, 2002; U.S. Pat. No. 6,447,951 issued Sep. 10, 2002; WO 01/54212 published Jul. 26, 2001; and U.S. Ser. No. 10/014,822 filed Oct. 26, 2001 hereby incorporated herein by reference. Physical mixtures of all of the above listed active cathode materials can also be employed. The most preferred cathode active material is a material having the formula $LiFe_{1-x}Mg_xPO_4$ wherein x is from about 0.01 to about 0.15. Other preferred cathode active materials are lithium vanadium phosphate materials or materials of the formula $LiM-FePO_4$ wherein M is selected from the group consisting of Zr, Ti, Nb, Mg and Ca.

Electronically conductive fillers useful herein include materials such as carbon black, graphite, powdered nickel, metal particles, metal coated particles, conductive ceramics, conductive fibers, conductive polymers (e.g. characterized by a conjugated network of double bonds like polypyrrole and polyacetylene) and the like. A preferred electronic conductive filler is carbon black. The amount of conductive filler can range from about 1 wt % to about 25 wt %, preferably from about 3 wt % to about 10 wt % and more preferably from about 3 wt % to about 7 wt %.

Current collectors are generally known in the battery art and any current collector useful in a battery can be used for casting the electrode slurry. The preferred current collector for use with the cathode slurry is aluminum foil. The preferred current collector for use with the anode slurry is copper foil.

Plasticizers can optionally be added to the reaction mixture or the crosslinked polymers can be plasticizer free. When used the plasticizers act as chain lubricants. A preferred plasticizer is 1.5M $LiBF_4$ in EC/BL (1:3 by volume) because of its good compatibility with the polymer, its high conductivity (over $6\times10^{-3}$ S/cm at room temperature and over $1.0\times10^{-3}$ S/cm at −40°), its low vapor pressure, high boiling point (216° C.) and its good electrochemical stability. Other plasticizers and the amounts added are as described in the preceding section on Crosslinked Polymers and Electrolyte Films.

The time, temperature and reaction conditions are as described in the preceding section on Crosslinked Polymers and Electrolyte Films.

The anode and cathode films produced for the present invention can generally be any thickness which would be useful in a battery, fuel cell, sensor, supercapacitor or electrochromic devices and the like. However, the thickness of the anode and cathode films of the present invention for use in a battery are preferably from about 10 µm to about 200 µm, and more preferably from about 50 µm to about 150 µm.

The anodes and cathodes produced in the present invention find use in batteries and more particularly find use in batteries employing the crosslinked polymer electrolyte of the present invention. In addition the electrodes of the present invention find use in the method of producing batteries which is another aspect of the present invention.

Batteries and Methods of Making Batteries. Although the crosslinked electrolyte polymers of the present invention are generally useful in batteries, a low cost, efficient and reproducible processing method was discovered for making batteries while working with the crosslinked electrolyte polymers and the anode and cathode films containing the crosslinked polymers of the present invention. In general, the electrolyte film is formed as described above. Anode and cathode films are prepared as generally described above. The electrolyte film is then interposed between the anode and cathode film and then the assembly is pressed and heated to melt flow of the crosslinked polymer electrolyte resulting in a high performance solid polymer electrolyte rechargeable battery.

A selected soluble monomer is mixed with a mixture of a second monomer, a lithium salt and an initiator to form a reaction mixture "A". A portion of the mixture "A" is cast on a substrate and heated to form a crosslinked polymer electrolyte. A portion of the mixture "A" is mixed with an anode intercalation material and an electronically conductive filler. In some instances, those with skill in the art recognize, that the electronically conductive filler may not be needed in that the material is conductive enough without such a filler. The slurry so formed is cast on a current collector with a doctor blade which is then heated to form an anode electrode film. A portion of the mixture "A" is mixed with a cathode intercalation material and an electronically conductive filler. The slurry so formed is then cast on a current collector and heated to form a cathode electrode film. The electrolyte film is then interposed between the anode and cathode films and the assembly so formed is pressed and heated. It should be noted that the variations and preferences recited above are also applicable to the steps and overall method of the present invention. The battery so formed can optionally be enclosed in a protective casing. The result is a high performance rechargeable solid polymer electrolyte battery.

The batteries of the present invention comprise a cathode comprising an electroactive material; an anode which is a counter-electrode to said first electrode comprising an electroactive material; and a crosslinked polymer electrolyte interposed between the cathode and anode. The anode and cathode can be the anodes and cathodes of the present invention prepared by incorporating the crosslinked polymer into the anode and/or cathode film. Alternatively the anodes and cathodes can be any anode or cathode which is compatible with the crosslinked polymer electrolyte film. Such anodes and cathodes are prepared by methods known to those skilled in the art using materials which are commercially available or which can be prepared from commercially available materials according to methods well known in the art.

Active cathode materials include but are not limited to all the active cathode materials described hereinabove including transition metal phosphates, metal oxides (particularly transition metal oxides), metal chalcogenides and mixtures thereof. Other active cathode materials include lithiated transition metal oxides such as $LiCoO_2$, $LiNiO_2$, and mixed transition metal oxides such as $LiCo_{1-m}Ni_mO_2$, where $0<m<1$. Other active materials include lithiated spinel active materials exemplified by compositions having a structure of $LiMn_2O_4$. Other cathode active materials include but are not limited to lithium vanadium phosphate, CoO, lithium metal, lithium sulfide and the like. The preferred cathode materials are transition metal phosphates as disclosed in U.S. Ser. No. 09/484,799 (filed Jan. 18, 2000), U.S. Ser. No. 09/484,919 (filed Jan. 18, 2000), U.S. Ser. No. 10/116,276 (filed Apr. 3, 2002), U.S. Ser. No. 10/116,450 (filed Apr. 3, 2002) and U.S. Ser. No. 10/115,802 (filed Apr. 3, 2002) hereby incorporated herein by reference. Other preferred cathode materials are lithium vanadium phosphates such as those disclosed in U.S. Pat. No. 5,871,866 issued Feb. 16, 1999; U.S. Pat. No. 5,908,716 issued Jun. 1, 1999; U.S. Pat. No. 6,136,472 issued Oct. 24, 2000; U.S. Pat. No. 6,153,333 issued Oct. 28, 2000; U.S. Pat. No. 6,387,568 issued May 14, 2002; U.S. Pat. No. 6,447,951 issued Sep. 10, 2002; WO 01/54212 published Jul. 26, 2001; and U.S. Ser. No. 10/014,822 filed Oct. 26, 2001 hereby incorporated herein by reference. The most preferred cathode active material is a material having the formula $LiFe_{1-x}Mg_xPO_4$ wherein x is from about 0.01 to about 0.15. Other preferred cathode active materials are lithium vanadium phosphate materials or materials of the formula $LiMFePO_4$ wherein M is selected from the group consisting of Zr, Ti, Nb, Mg and Ca.

The negative electrode material to be used may be an arbitrary compound as long as it can intercalate and deintercalate lithium ions. All the negative electrode active materials described herein above are also suitable for use herein. Suitable anodes contain intercalation materials which include, but are not limited to lithium, carbon, graphite, cokes, meso carbons, tungsten oxides, metal oxides (particularly transition metal oxides), metal phosphates (particularly transition metal phosphates), metal chalcogenides and lithium alloys, such as alloys of lithium with aluminum, mercury, manganese, iron, and zinc and mixtures thereof. A preferred anode is carbon, such as coke or graphite however any electroactive anode material compatible with the disclosed process can be used.

The anodes and cathodes of the batteries of the present invention can contain additional materials such as binders, electronically conductive fillers, plasticizers, dispersants, fillers and the like which are known to those skilled in the art.

The batteries of the present invention comprise a cathode electroactive material mixed with electronically conductive fillers and optionally with other materials suitable for use in a battery to form a cathode film. The electrolyte is a film comprised of the crosslinked polymers of the present invention. The electrolyte film is positioned on the cathode film. The electrolyte film is then covered with an anode film comprised of an anode electroactive material mixed with electronically conductive fillers and optionally with other materials suitable for use in a battery. The assembly so formed is then pressed and heated to melt flow of the crosslinked polymer electrolyte to form the batteries of the present invention. A protective bagging or casing material optionally covers the battery so formed and prevents infiltration of air and moisture.

The current collectors of the present invention are well known in the art. The current collectors usable in the cathode may be made of aluminum, stainless steel, nickel, titanium or alloys thereof. The preferred current collector in the cathode is aluminum. The current collectors usable in the anode may be made of copper, stainless steel, nickel titanium or alloys thereof. The preferred current collector used in the anode is copper. The current collector can be in the form of a foil, an expanded metal, a punched metal, a graphite cloth or wire gauze.

The following examples are offered to illustrate the present invention and should not be construed in any way as limiting its scope.

EXAMPLES 1–5

Synthesis of Crosslinked Polymer Electrolytes

For the following procedures first the inhibitor was removed from all of the monomers by passing the monomers through a column containing aluminum oxide (activated, basic, $Al_2O_3$) and Sea-Sand fine powder. ($Al_2O_3$ and Sea-sand were obtained from Aldrich.) All solvents which were utilized in the following procedures were purified by distillation.

Example 1

Preparation of POEM-X-PTEVS-PEGDME-LiN$(CF_3SO_2)_2$

Step 1: TEVS (60 ml, obtained from Aldrich), AIBN (0.4822 g, obtained from Aldrich) and a medium stir bar were placed in an Air-free reaction flask (500 ml). (The Air-free reaction flask was obtained from Chemglass.)

Step 2: The reaction system was bubbled with argon gas under stirring for 30 minutes to remove the air from the reaction system.

Step 3: The reaction system was heated at 63° C. under stirring for three days to polymerize the TEVS. The resulting product was PTEVS.

Step 4: The resulting product was cooled to room temperature.

Step 5: POEM (20.9 ml, obtained from Aldrich), PEGDME (9 ml, obtained from Aldrich), LiN$(CF_3SO_2)_2$ (6.31 g, obtained from 3M), AIBN (0.0773 g) and PTEVS (4.0 ml, produced in Step 3) and a stir bar were placed in another reactor.

Step 6: The reaction system was bubbled with argon gas under stirring for 30 minutes. The slurry was then cast onto a PTFE plate.

Step 7: The reaction system was heated to 80° C. under stirring for one hour.

Step 8: The reaction system was cooled to room temperature.

Step 9: The reaction system was removed into a glove box for further electrochemical evaluation (conductivity testing and battery cycling test).

The ionic conductivity of the film was evaluated by impedance spectroscopy using a waveform generator/response analyzer (FRA, Solarton model 1260 frequency-response analyzer, Solarton Analytical, Houston, Tex.) between 106 to 100 Hz controlled by a personal computer running commercially available software. The test fixture consisted of two blocking electrodes made of stainless steel—SS/Polymer electrolyte/SS.

Ionic conductivity, $\sigma$, of a solid polymer electrolyte can be expressed as K=$\sigma$A/l [Equation 1] wherein K is the conductance, l is the thickness of the electrolyte film and A is its area. The specific conductivity is calculated from the measures resistance, R, of the electrolyte using Equation 1 since K=1/R, $\sigma$=1/[AR].

Conductivity testing of this electrolyte exhibited $\sigma$~3.4× $10^{-4}$ S/cm.

Example 2

Preparation of POEM-X-PTEVS-EC-PC-LiN$(CF_3SO_2)_2$

Step 1: PTEVS was prepared as set forth in Example 1, Steps 1–4.

Step 2: POEM (20.9 ml), EC (7 ml, obtained from Aldrich), PC (5 ml, obtained from Aldrich, LiN$(CF_3SO_2)_2$ (6.31 g), AIBN (0.0778 g), PTEVS (4.5 ml) and a stir bar were place in a reactor.

Step 3: The reactor was bubbled with argon gas under stirring for 30 minutes.

Step 4: The reactor was heated at 75° C. under stirring for three hours.
Step 5: The reactor was cooled to room temperature.
Step 6: The reactor was removed into a glove box for further electrochemical evaluation).
Conductivity testing of this electrolyte exhibited σ~5.6× $10^{-4}$ S/cm (27 wt % of EC-PC).

Example 3

Preparation of PEGDMA-X-PTEVS-EC-PC-LiPF$_6$

Step 1: PTEVS was prepared according to the procedure set forth in Example 1, Steps 1–4.
Step 2: PEGDMA ((2.8 ml, obtained from Aldrich), PTEVS (2.8 ml), EC (20 ml), PC (20 ml), LiPF$_6$ (7.86 g, obtained from Stella Chemifa), AIBN (0.0197 g) and a stir bar were placed in a reactor.
Step 3: The reactor was bubbled with argon gas with stirring for 30 minutes.
Step 4: The reactor was heated at 80° C. with stirring for three hours.
Step 5: The reactor was cooled to room temperature and removed to a glove box for further electrochemical evaluation.
Conductivity testing of this electrolyte exhibited σ~3.0× $10^{-3}$ S/cm.

Example 4

Preparation of POEM-X-PDMSD-LiN(CF$_3$SO$_2$)$_2$

Step 1: POEM (14.8 ml), PDMSD (4.0 ml, obtained from Gelest Inc.), ethyl acetate (96 ml, obtained from Fluka), LiN(CF$_3$SO$_2$)$_2$ (1.8 g), AIBN (0.072 g) and a stir bar were placed in a reactor.
Step 2: The reactor was bubbled with argon gas under stirring for 30 minutes.
Step 3: The reactor system was heated to 66° C. under stirring for 24 hours.
Step 4: The reactor system was cooled to room temperature.
Step 5: The reaction was stopped by adding THF (20 ml, obtained from Aldrich).
Step 6: The reactor system was removed to a glove box and the solvents evaporated.
The electrolytes were vacuumed and the resulting polymer electrolyte was ready for further electrochemical evaluation. This plasticizer free crosslinked polymer electrolyte exhibited conductivity over 1×$10^{-4}$ S/cm at room temperature.

Example 5

Preparation of POEM-X-PDMSD-EC-BL-LIBF$_4$

Step 1: POEM (9.0 ml), PDMSD (3.0 ml), 1.5 M LiBF$_4$ (obtained from Stella Chemifa) in EC-BL (EC/BL=1:3 volume ratio, 12 ml, both obtained from Aldrich), AIBN and a stir bar were placed in a reactor.
Step 2: The reactor was bubbled with argon gas under stirring for 30 minutes.
Step 3: The reactor system was heated at 66° C. under stirring for 3 hours.
Step 4: The reactor system was cooled to room temperature.
Step 5: The reactor was removed to a glove box and the resulting polymer electrolyte was ready for further electrochemical evaluation.
This crosslinked polymer electrolyte exhibited conductivities over 2×$10^{-3}$ S/cm at room temperature, over 3×$10^{-4}$ S/cm at −20° C. and at 85° C. it remains in a solid state.

EXAMPLES 6–11

Preparation of Composite Electrodes

Example 6

Cathode Electrode A

Step 1: LiMg$_x$Fe$_{1-x}$PO$_4$ wherein 0.01<x<0.15 (7.0 g) was mixed thoroughly with carbon black (0.21 g, obtained from Ensaco).
Step 2: POEM (1.43 ml), PTEVS (0.32 ml), 1.3 M LiPF$_6$ in EC-PC (EC/PC=1 in volume ratio, 2.14 ml), and AIBN (0.045 g) were mixed thoroughly.
Step 3: The products of Step 1 and Step 2 were mixed thoroughly and the resulting slurry was coated on a carbon coated Al foil (obtained from ALL Foil, Inc., USA) using a doctor blade.
Step 4: The coated film was heated at 100° C. for one hour under argon gas.

Example 7

Anode Electrode B

Step 1: MCMB 25–28 (7.0 g, obtained from Osaka Gas Company, Limited, Japan)) was mixed thoroughly with carbon black (0.21 g, obtained from Ensaco).
Step 2: POEM (1.43 ml), PTEVS (0.32 ml), 1.3 M LiPF$_6$ in EC-PC (EC/PC=1 in volume ratio, 2.14 ml), and AIBN (0.045 g) were mixed thoroughly.
Step 3: The products of Step 1 and Step 2 were mixed thoroughly and the resulting slurry was coated on a Cu foil (obtained from All-foil, INC., USA) using a doctor blade.
Step 4: The coated film was heated at 100° C. for one hour under argon gas.

Example 8

Cathode Electrode C

Step 1: LiMg$_x$Fe$_{1-x}$PO$_4$ wherein 0.01<x<0.15 (7.0 g) was mixed thoroughly with carbon black (0.33 g, obtained from Ensaco).
Step 2: POEM (3 ml), PDMSD (1.0 ml), 1.5 M LiBF$_4$ in EC-BL (EC/BL=1:3 volume ratio, 4.5 ml), and AIBN (0.002 g) were mixed thoroughly.
Step 3: The products of Step 1 and Step 2 were mixed thoroughly and the resulting slurry was coated on a carbon coated Al foil using a doctor blade.
Step 4: The coated film was heated at 100° C. for one hour under argon gas.

Example 9

Anode Electrode D

Step 1: MCMB 25-28 (7.0 g) was mixed thoroughly with carbon black (0.21 g, obtained from Ensaco).
Step 2: POEM (3 ml), PDMSD (1.0 ml), 1.5 M LiBF$_4$ in EC-BL (EC/BL=1:3 volume ratio, 4.5 ml), and AIBN (0.002 g) were mixed thoroughly.
Step 3: The products of Step 1 and Step 2 were mixed thoroughly and the resulting slurry was coated on a carbon coated Cu foil using a doctor blade.
Step 4: The coated film was heated at 100° C. for one hour under argon gas.

Example 10

Cathode Electrode E

Step 1: $LiMg_xFe_{1-x}PO_4$ wherein $0.01<x<0.15$ (7.0 g) was mixed thoroughly with carbon black (0.33 g, obtained from Ensaco).

Step 2: POEM (3 ml), PDMSD (1.0 ml), $LiBF_4$ ([EO]/[Li$^+$]= 20, [EO] based on POEM), ethyl acetate 94.0 ml) and AIBN (0.002 g) were mixed thoroughly.

Step 3: The products of Step 1 and Step 2 were mixed thoroughly and the resulting slurry was coated on a carbon coated Al foil using a doctor blade.

Step 4: The coated film was heated at 100° C. for one hour under argon gas.

Example 11

Anode Electrode F

Step 1: MCMB 25–28 (7.0 g) was mixed thoroughly with carbon black (0.21 g, obtained from Ensaco).

Step 2: POEM (3 ml), DMSD (1.0 ml), $LiBF_4$ ([EO]/[Li$^+$]= 20, [EO] based on POEM), and AIBN (0.002 g) were mixed thoroughly.

Step 3: The products of Step 1 and Step 2 were mixed thoroughly and the resulting slurry was coated on a carbon coated Cu foil using a doctor blade.

Step 4: The coated film was heated at 100° C. for one hour under argon gas.

Example 12

Polymer Battery Assembly

Step 1: An electrolyte film was obtained according to the methods described in Examples 1–5.

Step 2: An anode electrode B, D or F was prepared as described in Examples 7, 9 and 11.

Step 3: A cathode electrode A, C or E was prepared as described in Examples 6, 8 and 10.

Step 4: Batteries were assembled by (a) positioning an electrolyte layer over an anode; (b) positioning a cathode over the electrolyte to form a battery assembly; (c) heating the assembly to a temperature wherein the polymer undergoes melt flow; and (d) cooling the assembly to room temperature.

The description of the invention is merely exemplary in nature and, thus, variations that do not depart from the gist of the invention are intended to be within the scope of the invention. Such variations are not to be regarded as a departure from the spirit and scope of the invention.

We claim:

1. A crosslinked polymer electrolyte comprised of at least one first monomer crosslinked to at least one or more second monomer wherein the one or more second monomer is the same or different from the first monomer selected from the group consisting of:
   (a) POEM-X-PDMSD-LiN(CF$_3$SO$_2$)$_2$;
   (b) POEM-X-PDMSD-EC-BL-LiBF$_4$;
   (c) POEM-X-PDMSD-EC-BL-LiPF$_6$;
   (d) POEM-X-PDMSD-EC-BL-LiBF$_4$-LiPF$_6$;
   (e) POEM-X-PDMSD-EC-PC-LiN(CF$_3$SO$_2$)$_2$;
   (f) POEM-X-PTEVS-LiN(CF$_3$SO$_2$)$_2$;
   (g) POEM-X-PTEVS-PEGDME-LiN(CF$_3$SO$_2$)$_2$;
   (h) POEM-X-PTEVS-EC-PC-LiN(CF$_3$SO$_2$)$_2$; and
   (i) POEM-X-PDMSM-PEGDME-LiN(CF$_3$SO$_2$)$_2$.

2. A crosslinked polymer electrolyte comprising a first monomer selected from the group consisting of PDMSD, PDMSM and PTEVS crosslinked to at least one or more second monomer wherein the one or more second monomer is the same or different from the first monomer.

3. A polymer electrolyte according to claim 2 wherein the PDMSD, PDMSM and PTEVS monomer is crosslinked to a low Tg monomer.

4. A crosslinked polymer comprised of at least one first monomer crosslinked to at least one or more second monomer wherein the one or more second monomer is the same or different from the first monomer selected from the group consisting of:
   (a) POEM-X-PDMSD-LiN(CF$_3$SO$_2$)$_2$;
   (b) POEM-X-PDMSD-EC-BL-LiBF$_4$;
   (c) POEM-X-PDMSD-EC-BL-LiPF$_6$;
   (d) POEM-X-PDMSD-EC-BL-LiBF$_4$-LiPF$_6$;
   (e) POEM-X-PDMSD-EC-PC-LiN(CF$_3$SO$_2$)$_2$;
   (f) POEM-X-PTEVS-LiN(CF$_3$SO$_2$)$_2$;
   (g) POEM-X-PTEVS-PEGDME-LiN(CF$_3$SO$_2$)$_2$;
   (h) POEM-X-PTEVS-EC-PC-LiN(CF$_3$SO$_2$)$_2$; and
   (i) POEM-X-PDMSM-PEGDME-LiN(CF$_3$SO$_2$)$_2$.

5. A crosslinked polymer comprising a PDMSD monomer crosslinked to at least one or more second monomer wherein the one or more second monomer is the same or different from the first monomer.

6. A crosslinked polymer according to claim 5 wherein the PDMSD monomer is crosslinked to a low Tg monomer.

7. A crosslinked polymer comprising a PDMSM monomer crosslinked to at least one or more second monomer wherein the one or more second monomer is the same or different from the first monomer.

8. A crosslinked polymer according to claim 7 wherein the PDMSM monomer is crosslinked to a low Tg monomer.

9. A crosslinked polymer comprising a PTEVS monomer crosslinked to at least one or more second monomer wherein the one or more second monomer is the same or different from the first monomer.

10. A crosslinked polymer according to claim 9, wherein the PTEVS monomer is crosslinked to a low Tg monomer.

* * * * *